United States Patent [19]

Garbo

[11] 4,297,913

[45] Nov. 3, 1981

[54] REMOTE CONTROL HAVING PUSH-PULL BLADE WITH CAPTIVE ROLLING ELEMENTS

[76] Inventor: Paul W. Garbo, 48 Lester Ave., Freeport, N.Y. 11520

[21] Appl. No.: 25,008

[22] Filed: Mar. 29, 1979

[51] Int. Cl.$^3$ .................................. F16C 1/10

[52] U.S. Cl. .................................. 74/501 R; 308/6 R

[58] Field of Search .................. 74/501 R, 501 P, 502; 308/6 R, 6 B; 64/2 R

[56] References Cited

U.S. PATENT DOCUMENTS

| | | | |
|---|---|---|---|
| 1,666,893 | 4/1928 | Garrard | 308/6 |
| 3,452,615 | 7/1969 | Gregory | 74/501 |
| 3,667,313 | 6/1972 | Young | 74/501 P |

FOREIGN PATENT DOCUMENTS

| | | | |
|---|---|---|---|
| 153052 | 7/1904 | Fed. Rep. of Germany | 308/6 R |

*Primary Examiner*—Kenneth Dorner
*Attorney, Agent, or Firm*—Paul W. Garbo

[57] ABSTRACT

Remote controls of the type in which a push-pull blade extends through a tubular sheath and is supported on its opposite sides by rolling elements held spaced from one another by cage strips are improved by providing openings in the push-pull blade to capture the rolling elements and thus obviate the cage strips. A feature of the improvement is that the openings in the blade are dimensioned to permit the rolling elements on opposite sides of the blade to be in rolling contact with each other.

16 Claims, 8 Drawing Figures

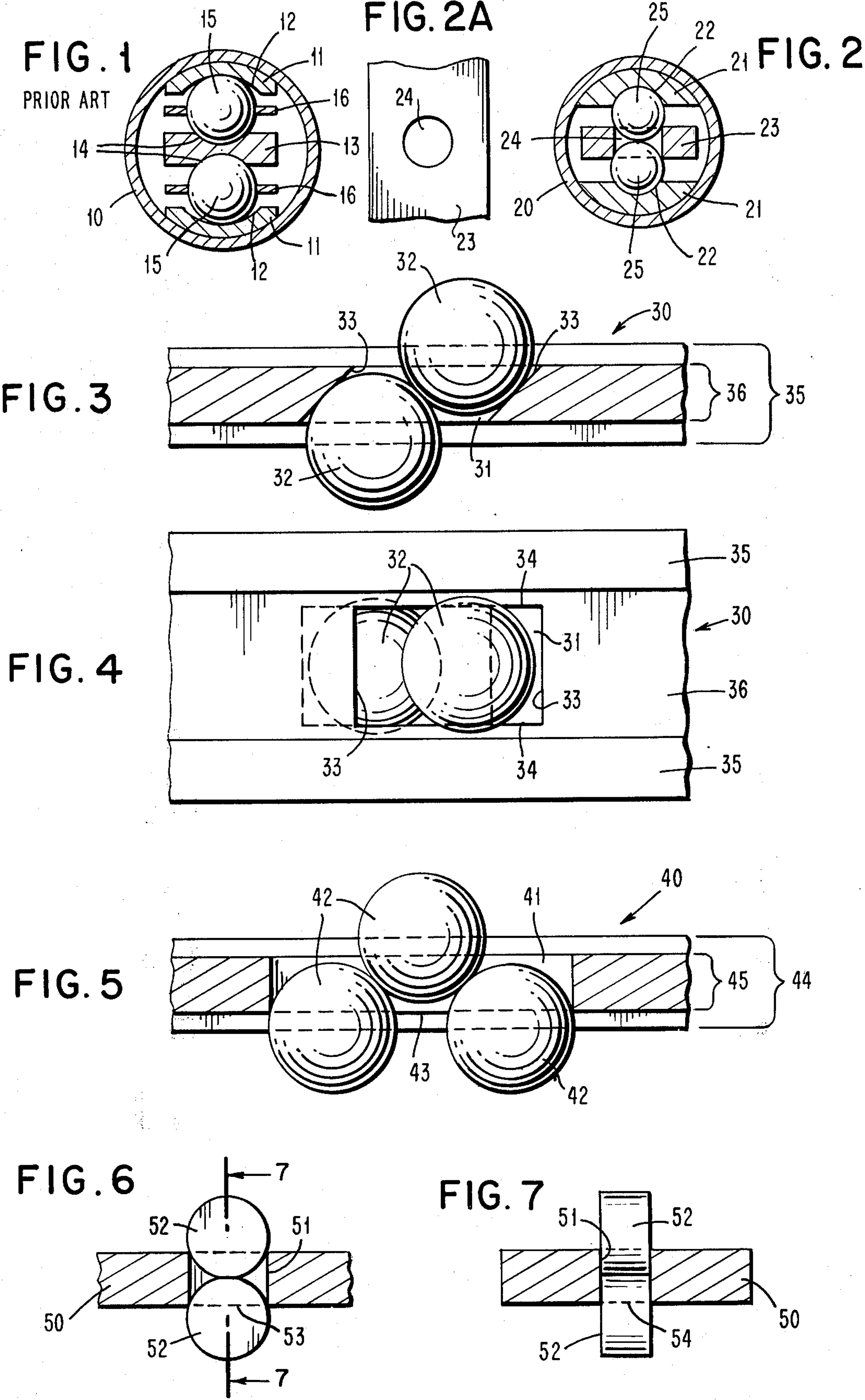
FIG. 1
PRIOR ART
FIG. 2A
FIG. 2
FIG. 3
FIG. 4
FIG. 5
FIG. 6
FIG. 7

REMOTE CONTROL HAVING PUSH-PULL BLADE WITH CAPTIVE ROLLING ELEMENTS

BACKGROUND OF THE INVENTION

This invention relates to tubular remote controls in which a push-pull blade is movable lengthwise in the tubular member of the control while the blade is supported on each of its opposite sides by a series of spaced rolling elements.

Illustrative of such a remote control is that disclosed in U.S. Pat. No. 3,287,990 to Ellinger wherein the bearing balls of each of two series are held spaced along the push-pull blade by a cage strip. U.S. Pat. No. 4,062,251 to Parsons reveals an intricate ball-cage strip and a costly machine for making the ball-cage strip. U.S. Pat. No. 3,667,313 to Young shows a simplified ball-cage strip.

Obviously, the two cage strips on opposite sides of the push-pull blade add to the cost and weight of the remote control. Furthermore, the cage strips occupy space and thus make it necessary to have a tubular sheath with a diameter larger than would be required if the cage strips were not present. Thus, the remote control has a sheath or conduit of larger diameter, weight and cost than would be the case if the two cage strips were eliminated.

Moreover, inasmuch as both cage strips move each time the push-pull blade is moved, the remote control has three movable elongate members each of which is susceptible to wear, damage and malfunction from reciprocating the push-pull blade over a long period of time. Clearly, a remote control in which the push-pull blade is the sole movable elongate member is highly desirable.

Accordingly, the object of this invention is to eliminate the two cage strips in a remote control by providing the push-pull blade with openings spaced along its length which are dimensioned to hold rolling elements on opposite sides of the blade in rolling contact with each other.

SUMMARY OF THE INVENTION

In accordance with this invention, the push-pull blade of a remote control has a series of spaced openings or apertures disposed along the longitudinal center line of the blade capable of holding rolling elements partially embedded in the blade from both sides and allowing the opposed rolling elements to be in rolling contact with each other.

Each opening through the push-pull blade must be dimensioned to prevent a rolling element from passing through the blade. For example, if the rolling elements are bearing balls, the diameter of cylindrical perforations in the blade to hold the balls must be slightly less than the diameter of the balls. The perforations may have any of various shapes. Thus, bearing balls may be captured in square or elliptical as well as circular holes. When the rolling elements are cylindrical rollers, the perforations are usually rectangular. The two sides of the rectangular hole corresponding to the length of each roller are long enough so that the roller fits in the hole with its circular faces mking only light contact with the other two sides of the hole which have a length slightly less than the diameter of the cylindrical rollers.

For a fuller understanding of the invention, its further description will refer to the appended drawings which show different embodiments of the invention.

BRIEF DESCRIPTION OF THE DRAWINGS

FIG. 1 is a diametrical cross section of a conventional remote control;

FIG. 2 is a diametrical cross section of a remote control embodying the invention;

FIG. 2A is a top view of the blade shown in FIG. 2;

FIG. 3 is an enlarged longitudinal cross section taken along the center of a push-pull blade of this invention in which perforations extend through the blade at an angle of 45° to the length of the blade;

FIG. 4 is a top view of the blade shown in FIG. 3;

FIG. 5 is similar to FIG. 3 but shows a blade using groups of three bearing balls in place of pairs of balls;

FIG. 6 is similar to FIG. 3 but shows a blade using two cylindrical rollers in each perforation in place of two bearing balls; and FIG. 7 is a cross section of the blade of FIG. 6, taken along the line 7—7.

DESCRIPTION OF PREFERRED EMBODIMENTS

The conventional remote control of FIG. 1 comprises tubular sheath or conduit 10 holding two outer ball races 11, each having an arcuate indentation or groove 12, and push-pull blade 13 with arcuate grooves 14 on its opposite sides. Blade 13 is supported on each of its opposite sides by a series of bearing balls 15 which engage a groove 14 of blade 13 and groove 12 of race 11. As known, each series of balls 15 requires ball-cage strip 16 to maintain a desired spacing between consecutive balls 15 along the length of blade 13. It is particularly clear in the aforementioned patents to Parsons and Young that the cage strips have a thickness which is an appreciable portion of the inside diameter of the tubular conduit of the remote control.

FIG. 2 shows a remote control embodying this invention. Conduit 20 holds two outer ball races 21, each having an arcuate groove 22, and push-pull blade 23 positioned equidistantly from opposed races 21. Blade 23 has perforations 24 through its center and spaced from one another along the length of blade 23 by a distance comparable to that between the consecutive perforations of a conventional ball-cage strip. Each perforation 24 is dimentioned so that bearing ball 25 cannot pass therethrough but is in rolling contact with another ball 25 placed in the opposite end of perforation 24.

The arrangement of opposed ball races, two series or rows of bearing balls and a central push-pull blade is collectively referred to as a stack. Comparing FIGS. 1 and 2, it is evident that while push-pull blades 13 and 23 have the same overall transverse cross section, balls 25 are smaller than balls 15 and the stack of FIG. 2 fits in conduit 20 having a smaller diameter than that of conduit 10 required to hold the stack of FIG. 1 which includes two ball-cage strips 16. Hence, the invention not only has eliminated the cost and weight of two ball-cage strips but also has made it possible to reduce the size of the bearing balls and the conduit of the remote control with attendant further reductions in weight and cost of the control.

In FIG. 2, each perforation 24, which may be circular or square in transverse cross section, passes through blade 23 in a direction normal to its two wide sides.

FIG. 2A is the top view of a short length of only blade 23 with a circular perforation 24.

FIG. 3 shows that the perforations in the center blade may be slanted rather than normal to its two wide sides. Blade 30 has rectangular perforations 31 extending through blade 30 at an angle of 45° to the reciprocating direction of blade 30. A slant of 45° is preferred over other angles because at 45° the pair of bearing balls 32 positioned in each slanted perforation 31 will encounter no more frictional resistance to their rotation during the push stroke of blade 30 than the rotational resistance of balls 32 during the pull stroke of blade 30.

FIG. 4 shows that rectangular perforation 31 in blade 30 of FIG. 3 has two shorter sides 33 and two longer sides 34. Balls 32 have a diameter greater than the length of shorter sides 33. Hence, balls 32 are prevented from falling through rectangular perforation 31 by its two longer sides 34.

To strengthen push-pull blade 30, its two edge portions 35 are thicker than its central portion 36.

In FIG. 5, blade 40 has rectangular perforation 41 which is long enough to capture three bearing balls 42 arranged with two balls 42 set in one end of perforation 41 and one ball set in the opposite end of perforation 41. The two balls 42 disposed on one side of blade 40 do not contact each other so that both can freely roll with clockwise rotation when blade 40 is pulled to the right of FIG. 5 and with counterclockwise rotation when blade 40 is pushed to the left. Single ball 42 disposed on the opposite side of blade 40 contacts both of the paired balls 42. When the paired balls 42 rotate clockwise, single ball 42 naturally rotates counterclockwise, and vice versa. Because of the triangular arrangement of the three balls 42, the imaginary line passing through the center of the single ball 42 and the center of each of the paired balls 42 is necessarily slanted relative to the length of blade 40, preferably at an angle of 45°.

Perforation 41 is a rectangular slot extending through blade 40 at right angles to its length. The longer side 43 of slot 41 has a length selected to permit the spacing of paired balls 42 which will give the desired triangular arrangement of paired balls 42 and single ball 42. The shorter side of slot 41 must be less than the diameter of balls 42 to prevent any ball 42 from passing through slot 41. Like blade 30 of FIGS. 3 and 4, blade 40 is strengthened by making its two edge portions 44 thicker than its central portion 45.

It is well to note that the triangular arrangement of three balls 42 shown in FIG. 5 is desirably inverted in every other slot 41 along the length of blade 40. Such alternating inversion of the triangular arrangement of balls 42 is preferred because it balances the total of balls 42 on one side of blade 40 with the total of balls 42 on the opposite side of blade 40. In accordance with the alternating inverted arrangement, slots 41 (not shown) immediately to the right and left of slot 41 in FIG. 5 will each have paired balls 42 above single ball 42.

FIGS. 6 and 7 illustrate the use of cylindrical rollers in lieu of bearing balls. Push-pull blade 50 has a row of spaced rectangular slots 51 extending vertically through the center of blade 50. Two cylindrical rollers 52 are set in slot 51 from the opposite sides of blade 50 and are in rolling contact with each other. The length 53 of slot 51 is less than the diameter of rollers 52 so that rollers 52 cannot pass through slot 51. However, the width 54 of slot 51 is sufficient to avoid binding between the circular end faces of rollers 52 and the two sides of slot 51 adjacent those end faces.

It has been pointed out that the perforations or slots uniformly spaced along the longitudinal center line of a push-pull blade of this invention must have one dimension less than the diameter of the bearing balls or cylindrical rollers with that blade to prevent the balls or rollers from falling through the blade. Generally, such slot dimension is in the range of about 80 to 90% of the diameter of the balls or rollers.

In most cases, conventional remote push-pull controls are made with a flexible tubular sheath. Occasionally, a rigid tubular sheath which has been bent with appropriate tooling into desired curves is used to form the remote control. Push-pull blades having embedded rolling elements in accordance with this invention may be used in flexible or rigid tubular sheaths. Also, most remote controls are made with two outer races as illustrated in FIGS. 1 and 2. However, as disclosed in U.S. Pat. No. 3,362,249 to Richoux, the two outer races may be omitted in making more economical and compact remote controls. The remote control of this invention eliminating the two cage strips for the rolling elements may also eliminate the two outer races when economy is of primary importance.

Those skilled in the art will visualize several variations of the invention set forth hereinbefore without departing from its spirit and scope. For instance, in slot of FIG. 4, the 90° corners can be rounded or the two sides 33 can be arcuate. Also, sides 33 of slot 31 can be perpendicular to the length of blade 30 and perpendicular slot 51 in FIG. 6 can be made slanted. Similarly, perpendicular slot 41 in blade 40 of FIG. 5 can be made slanted as shown in FIG. 3 by slanted slot 31. With bearing balls, an elliptical slot having a minor axis less than the ball diameter and a major axis greater than the ball diameter provides a desirable ball seat. Accordingly, only such limitations should be imposed on the invention as are set forth in the appended claims.

What is claimed is:

1. A remote control comprising a tubular sheath, a flexible push-pull blade extending longitudinally through said sheath and having a series of spaced openings disposed along the longitudinal center line of said blade, at least one rolling element seated in each of the opposite ends of each of said openings, each of said openings being dimensioned so that the opposed rolling elements in each of said openings are in contact with each other but are prevented from passing therethrough.

2. The remote control of claim 1 wherein the openings are slanted 45° to the length of the push-pull blade.

3. The remote control of claim 2 wherein the rolling elements are bearing balls and each opening is a substantially rectangular slot, the two shorter sides of said rectangular slot being at right angles to the center line of the push-pull blade and measuring less than the diameter of said bearing balls.

4. The remote control of claim 1 wherein the openings are perpendicular to the opposite sides of the push-pull blade.

5. The remote control of claim 4 wherein the rolling elements are bearing balls and each opening is a circular hole holding a single pair of said bearing balls.

6. The remote control of claim 1 wherein each of the openings holds two spaced rolling elements on one side of the push-pull blade and one rolling element on the opposite side of said blade in contact with both of said spaced rolling elements.

7. The remote control of claim 6 wherein the rolling elements are bearing balls and each opening is a substantially rectangular slot, the two shorter sides of said rectangular slot being at right angles to the center line of the push-pull blade and measuring less than the diameter of said bearing balls.

8. A flexible remote control comprising a flexible tubular sheath, a flexible push-pull blade extending longitudinally through said sheath and having a series of spaced openings disposed along the longitudinal center line of said blade, at least one rolling element seated in one end of each of said openings and at least one rolling element seated in the opposite end of each of said openings, the oppositely seated rolling elements in each of said openings being in contact with each other and being too large to pass through said openings.

9. The flexible remote control of claim 8 wherein the oppositely seated rolling elements are bearing balls, and two ball races, each having an arcuate groove, are positioned diametrically opposite each other within the tubular sheath and with said arcuate grooves in contact with said oppositely seated bearing balls.

10. The flexible remote control of claim 9 wherein each opening is a substantially rectangular slot slanted 45° to the length of the push-pull blade, the two shorter sides of said rectangular slot being at right angles to the center line of said blade and measuring less than the diameter of the bearing balls.

11. The flexible remote control of claim 9 wherein each opening is a substantially rectangular slot perpendicular to the length of the push-pull blade, the two shorter sides of said rectangular slot being at right angles to the center line of said blade and measuring less than the diameter of the bearing balls.

12. The flexible remote control of claim 11 wherein two spaced bearing balls are seated in one end of each rectangular slot and one bearing ball is seated in the opposite end of said slot and contacts both of said spaced bearing balls.

13. The flexible remote control of claim 9 wherein the openings are slanted 45° to the length of the push-pull blade and each of said openings has a single pair of oppositely seated bearing balls.

14. The flexible remote control of claim 9 wherein each opening is a circular hole and has a single pair of oppositely seated bearing balls.

15. The flexible remote control of claim 8 wherein the oppositely seated rolling elements are cylindrical rollers and each opening is a substantially rectangular slot, two sides of said rectangular slot being at right angles to the center line of the push-pull blade and measuring slightly more than the axial length of said rollers.

16. The flexible remote control of claim 15 wherein each rectangular slot is slanted 45° to the length of the push-pull blade and has a single pair of oppositely seated cylindrical rollers.

* * * * *

UNITED STATES PATENT OFFICE
CERTIFICATE OF CORRECTION

Patent No. 4,297,913 Dated Nov. 3, 1981

Inventor(s) Paul W. Garbo

It is certified that error appears in the above-identified patent and that said Letters Patent are hereby corrected as shown below:

Column 1, line 66, "mking" should be --making--.

Column 4, line 5, after "rollers" insert --used--;

line 26, after "slot" inse rt --31--.

Signed and Sealed this

*Tenth* Day of *May 1983*

[SEAL]

*Attest:*

GERALD J. MOSSINGHOFF

*Attesting Officer* *Commissioner of Patents and Trademarks*